United States Patent [19]
Patrick et al.

[11] Patent Number: 5,321,574
[45] Date of Patent: Jun. 14, 1994

[54] CIRCUIT BREAKER/SURGE ARRESTOR PACKAGE IN WHICH THE ARRESTOR USES AN MOV THAT IS THERMALLY DE-COUPLED FROM THE BREAKER'S THERMAL TRIP CIRCUIT

[75] Inventors: John R. Patrick, Stone Mountain; James S. Wells, Lawrenceville, both of Ga.

[73] Assignee: Siemens Energy & Automation, Inc., Alpharetta, Ga.

[21] Appl. No.: 822,509

[22] Filed: Jan. 17, 1992

[51] Int. Cl.⁵ ............................................. H02H 9/04
[52] U.S. Cl. .................................. 361/99; 361/56; 361/127
[58] Field of Search ............... 361/55, 56, 99, 105, 361/127

[56] References Cited

U.S. PATENT DOCUMENTS

| | | | |
|---|---|---|---|
| 2,839,635 | 6/1958 | Hasselhorn | 200/118 |
| 3,152,287 | 10/1964 | Edmunds | 317/46 |
| 3,312,889 | 4/1967 | Gold | 320/36 |
| 3,464,040 | 8/1969 | Powell | 335/191 |
| 3,717,792 | 2/1973 | Gryctko | 317/18 D |
| 3,733,516 | 5/1973 | Grunert et al. | 317/16 |
| 3,737,725 | 6/1973 | Donnelly | 317/16 |
| 3,887,849 | 6/1975 | Nagel | 317/36 |
| 3,889,222 | 6/1975 | Takano et al. | 337/244 |
| 3,934,175 | 1/1976 | Clark | 317/16 |
| 3,947,726 | 3/1976 | DeCecco et al. | 317/16 |
| 4,019,097 | 4/1977 | Miller et al. | 361/93 |
| 4,023,071 | 5/1977 | Fussell | 361/56 |
| 4,068,277 | 1/1978 | Simokat | 361/55 |
| 4,068,281 | 1/1978 | Harnden, Jr. | 361/106 |
| 4,084,207 | 4/1978 | Piccone et al. | 361/91 |
| 4,168,514 | 9/1979 | Howell | 361/56 |
| 4,479,101 | 10/1984 | Checinski | 335/37 |
| 5,032,946 | 7/1991 | Misencik et al. | 361/56 |

OTHER PUBLICATIONS

Designers' Guide to: Circuit protectors, Catalog entitled "Circuit Protectors," MCG Electronics Inc., 1974, pp. 3–5.

Primary Examiner—Todd DeBoer
Attorney, Agent, or Firm—Donald M. Boles

[57] ABSTRACT

A circuit breaker/surge arrestor package for plug-in installation in the space of two standard one-inch openings in a contemporary residential load center. The electrical and thermal characteristics of the components are selected such that a threshold of a substantially continuous current through a Metal Oxide Varistor in the surge arrestor causes the circuit breaker to trip magnetically before being able to trip thermally.

14 Claims, 3 Drawing Sheets

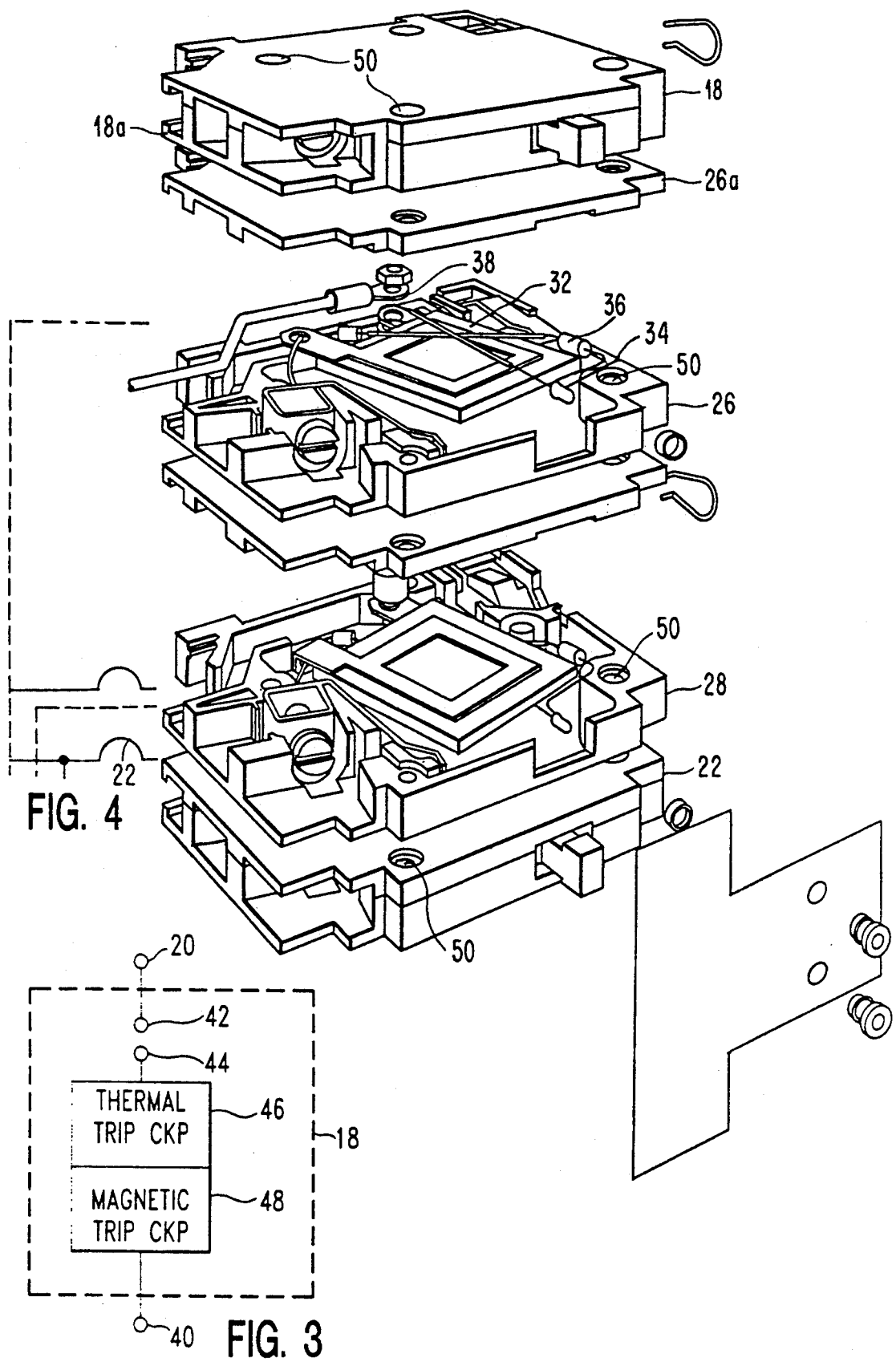

ced in residential load centers to protect electrical branch circuits from damage due to overcurrents and transients. A contemporary residential load center of this type is commercially available, for example under Siemens ENERGY AND AUTOMATION, INC. Catalog Number G2040MB1200CU or G1224MB1100CU, and has openings for push-on circuit breakers each serving to electrically connect a line stab to a load under normal operating conditions but to electrically disconnect the line from the load in case of overcurrent. An exemplary circuit breaker of this type is commercially available under Siemens ENERGY AND AUTOMATION, INC. Catalog Number Q21515. Exemplary features of a circuit breaker are described in U.S. Pat. No. 4,479,101. One circuit breaker of this type is ½ inch wide per line, so that a circuit breaker for two lines occupies an inch-wide push-in opening in the load center. Surge arrestors or suppressors or protectors also can be installed in a load center to provide protection against surges such as due to lightning. Examples of devices of this general type are discussed in U.S. Pat. Nos. 2,839,635, 3,152,287, 3,312,889, 3,464,040, 3,717,792, 3,733,516, 3,737,725, 3,887,849, 3,889,222, 3,934,175, 3,947,726, 4,019,097, 4,023,071, 4,068,277, 4,068,281, 4,084,207 and 4,168,514. It is believed that known surge suppressors suffer from shortcomings such as requiring additional wire connectors or special circuit features for proper circuit installation, providing protection only or mainly for surges with low energy levels, being prone to failure, using for protection only a circuit element such as a Metal Oxide Varistor (MOV) that could fail catastrophically if faulted, requiring long connecting electrical leads which could cause high circuit inductance and resulting high transient voltage discharge levels, requiring excessive use of non-standard components or manufacturing techniques, and/or having no means for conveniently showing operational status. The latest of these patents appears to propose a combined device incorporating both a circuit breaker and a surge arrestor in a single package, and is said to overcome certain shortcomings of the prior art. However, the patent states that the arrestor's varistor is packaged in a thermally coupled relationship with the circuit breaker's thermal element, typically a bi-metal, such that the heat generated by the flow of abnormal leakage current through the varistor will also indirectly heat the thermal element, thus contributing to the thermal tripping of the circuit breaker. See column 2, lines 26–43 and column 6, lines 13–29 in the cited patent. In addition, the cited patent does not appear to propose a means for readily and conveniently ascertaining the operational status of the lightning arrestor.

It is believed in view of the foregoing that a need remains for a circuit breaker/surge arrestor package that could be efficiently manufactured using only or mainly standard components and manufacturing techniques, could be easily and conveniently installed in a contemporary load center, and could provide effective protection as well as an easily ascertainable indication of operational status. The invention is directed to meeting such a need and, in a nonlimiting example, is embodied in a circuit breaker/surge arrestor comprising a circuit breaker which can be plugged into a load center to connect a line to a load and has a thermal trip circuit and a magnetic trip circuit each responsive to an overcurrent having respective characteristics to trip the circuit breaker and thereby disconnect the load from the line, a surge arrestor in series with the circuit breaker comprising a Metal Oxide Varistor (MOV) responsive to an onset of a respective threshold of current passage through the MOV to cause the circuit breaker's magnetic trip circuit to trip before the thermal trip circuit has had an opportunity to trip, and an indicator circuit coupled with the surge arrestor and comprising an indicator light which is visible from outside the surge arrestor and has ON and OFF states indicative of the operational status of the MOV and the circuit breaker. The exemplary circuit breaker in accordance with the invention can be manufactured using a standard circuit breaker, which can be used alone as a circuit breaker only but becomes a part of a package incorporating the invention when integrated with a surge arrestor in accordance with the invention. The normal housing of a standard circuit breaker can become at least a part of a thermal barrier between the MOV in the arrestor and the thermal trip circuit in the breaker. In the circuit breaker/surge arrestor in accordance with the invention, the response characteristics of the breaker and the arrestor matched with each other such that the breaker would trip magnetically in response to a certain threshold a substantially continuous current through the arrestor but not for example in response to an impulse that might momentarily be at the same or even a somewhat higher level but is too short in duration to present a danger.

BRIEF DESCRIPTION OF THE DRAWING

FIG. 3 is a partly schematic and partly block diagram of a circuit breaker useful in a circuit breaker/surge arrestor package in accordance with the invention.

FIG. 4 is a projection drawing of a circuit breaker/surge arrestor in accordance with an example of the invention.

DETAILED DESCRIPTION OF A PREFERRED EMBODIMENT

Figure 1:
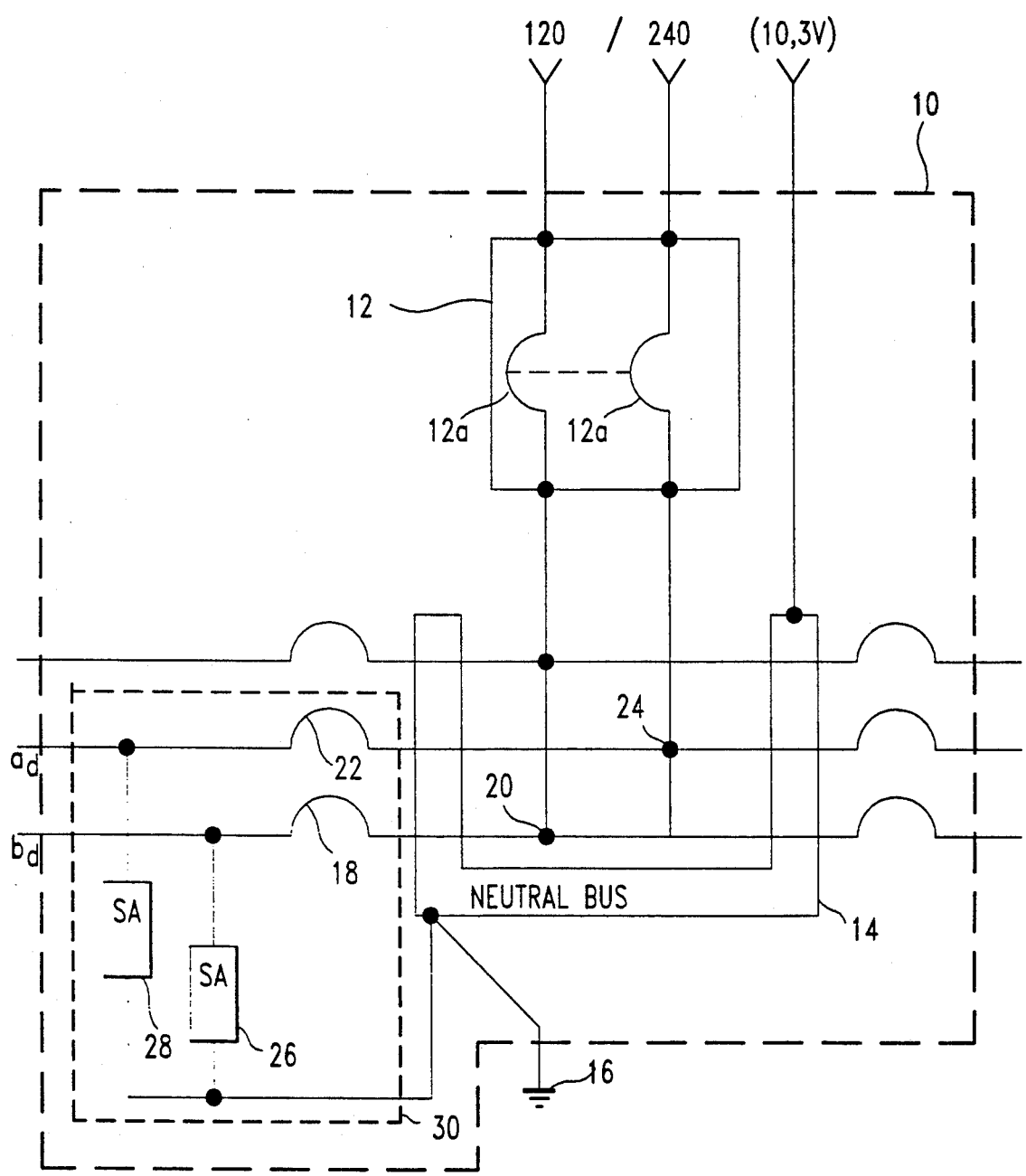
FIG. 1 is a schematic diagram of an exemplary load center with circuit breakers and surge arrestors in accordance with an example of the invention.

Referring to FIG. 1, service lines A and B supply an exemplary residential load center 10 having a main circuit breaker 12 that can include ganged main circuit breakers 12a and 12b. A neutral line N is connected to a neutral bus 14 in load center 10 and is grounded at 16. The hot side of a left pole circuit breaker 18 has a plug-in jaw for push-on connection to a left side, 120V A.C. stab 20 fed by line A, while the hot side of a right pole circuit breaker 22 has a plug-in jaw for push-on connection to a right side 120V A.C. stab 24 of opposite polarity fed by line B. Other branch circuits and branch circuit breakers are illustrated in FIG. 1, and can be configured the same as or differently from the branch circuit protected by branch circuit breakers 18 and 22. A surge arrestor 26 is connected to the load side of circuit breaker 18 and connects to neutral bus 14 and thus to ground through a short lead, and another surge arrestor 28 is similarly connected between the load side of branch circuit breaker 22 and ground. Branch circuit breakers 18 and 22 together with surge arrestors 26 and 28 form a plug-in, integrated circuit breaker/surge arrestor package 30. In this exemplary embodiment, load center 10 can be the device commercially available under Siemens ENERGY AND AUTOMATION, INC. Catalog No. G1224MB1100CU and branch circuit breakers 18 and 22 can each be the device commercially available under Siemens ENERGY AND AUTOMATION, INC. Catalog Number Q21515.

Figure 2:
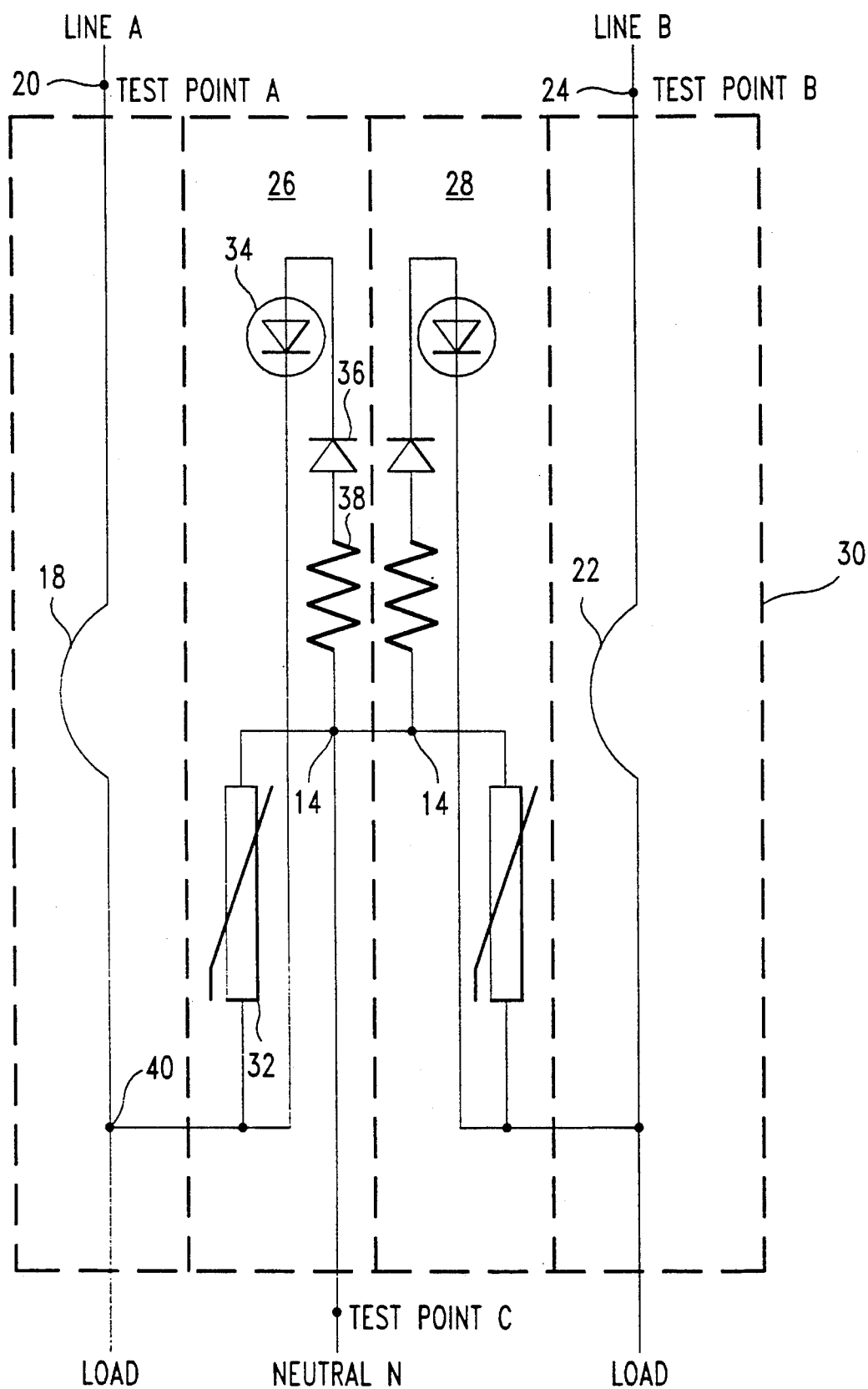
FIG. 2 is a schematic diagram of a circuit breaker/surge arrestor in accordance with an example of the invention.

Referring to FIG. 2, surge arrestor 26 comprises a Metal Oxide Varistor (MOV) 32 connected to the load side of circuit breaker 18 to provide a series path from line A (line stab 20) through breaker 18 and then through MOV 32 to ground. The load is connected to junction 40 between breaker 18 and MOV 32. In order to provide a convenient indication of operational status an indicator circuit comprising a Light Emitting Diode (LED) 34, bias diode 36 and bias resistor 38 in a series connection is connected across (in parallel with) MOV 32. The relevant parameters are selected such that: (a) LED 34 is ON (emits visible light) only when current flows through circuit breaker 18 but the resistance of MOV 32 is above a threshold, e.g., MOV 32 is essentially an open circuit; but (b) LED 34 is OFF when the resistance of MOV 32 is below a threshold, e.g., MOV 32 is essentially a short circuit and, of course, when circuit breaker 18 has tripped to disconnect junction 40 from line A. MOV 32 in this example can be the component commercially available under Siemens COMPONENTS, INC. Catalog No. LS40K230QP or LS40K1500QP. LED 34 can be the component commercially available under Siemens COMPONENTS, INC. Number LS3369-FO RED LED, bias diode 36 can be the component commercially available under the designation 1N4007, 1000V, 1 AMP diode, and bias resistor 38 can be a commercially available 100KΩ, ¼W, 5% carbon film resistor. As illustrated in FIG. 2, surge arrestor 28 has a similar construction and is similarly connected between the load side of breaker 22 and ground. Because it is a mirror image of surge arrestor 26, the description is not repeated. Each of circuit breakers 18 and 22 occupies a one-half inch wide space and each of surge arrestors 26 and 28 also occupies a one-half inch wide space, so that the entire circuit breaker/surge arrestor package 30 illustrated in FIG. 2 can occupy a two-inch wide opening in load center 10.

The electrical characteristics of MOV 32 are such that it permits virtually no conduction under normal, steady state operating voltages of load center 10. However, electrical transient voltages and lightning-induced voltage surges that exceed a clamping voltage limit of MOV 32 can be rapidly diverted to ground thereby protecting both electrical equipment connected to the load side of circuit breaker 18 at junction 40 and other wiring and loads connected to load center 10 as well. MOV 32 when subjected to high energy electrical surges fails in short circuit. If the short circuit is not cleared rapidly, the package in which MOV 32 is housed could rupture, with the potential for more extensive electrical system failure. However, because in accordance with the invention circuit breaker 18 is included as an integral circuit element, circuit breaker 18 serves to clear the fault current through MOV 32 by rapid magnetic tripping. The indicator circuit comprising LED 34 serves to provide a convenient, easily seen indication that the circuit breaker/surge arrestor for this particular load is turned ON and that surge protection is being provided for the entire load. Some of the advantages of this design are that the circuit breaker/surge arrestor package can be small and compact, requiring no direct contact with hot terminals during installation, that very short electrical leads can be used between MOV 32 and neutral bus 14 to thereby reduce circuit inductance and reduce discharge voltages and to improve electrical equipment protection, that each MOV (such as MOV 32) can have high energy capacity, e.g., an ability to withstand 40,000 Amp surges, that circuit breaker magnetic tripping protection is provided for each MOV (such as MOV 32) to prevent potential MOV package rupture and that if an MOV fails in short circuit, only the branch circuit for that MOV will be cleared by the associated circuit breaker while the other branch circuits can remain operational, that since the circuit breakers that are used to protect the MOV's remain available for use in operating circuits, the clearing of these circuits can provide a warning that the surge arrestor has failed sacrificially and requires replacement, and that the design in accordance with the invention eliminates a requirement for a fuse to clear an MOV short circuit failure and for an indicator for fuse failure.

Referring to FIG. 3, branch circuit breaker 18 comprises a line or hot side breaker contact 42 and a load side breaker contact 44 as well as a thermal trip circuit 46 and a magnetic trip circuit 48. More detail regarding suitable circuit breakers can be found by examining the commercially available circuit breakers identified above by a Siemens ENERGY AND AUTOMATION, INC. Catalog No. and literature thereon, and from the cited U.S. Pat. No. 4,479,101, which is hereby incorporated by reference in this disclosure. In general, contacts 42 and 44 when closed connect the load at junction 40 to the line which feeds stab 20 (line A) and when open disconnect the load from the line. Thermal trip circuit 46 trips in response to the heat generated due to an overcurrent having certain characteristics. For example, it trips in response to the heat generated by the flow of excessive current through a bi-metal strip. When it trips, thermal trip circuit 46 opens breaker contacts 42, 44. Magnetic trip circuit 48 also is responsive to overcurrent having respective characteristics to trip and thereby open contacts 42, 44.

Referring to FIG. 4, the circuit illustrated in FIG. 2 is implemented in an integrated package of left side branch circuit breaker 18, left side surge arrestor 26, right side surge arrestor 28 and a right side branch circuit breaker 22 assembled as illustrated and fastened into a single package by means of fasteners such as rivets or screws passing through matching corner openings such as 50 in each of the circuit breakers and surge arrestors. Each of the circuit breakers and each of the surge arrestors illustrated in FIG. 4 has its own housing; indeed the circuit breakers are standard items that can be used by themselves, without surge arrestors, in load centers. Thus, the housing of breaker 18 has a wall or cover 18a separating its thermal trip circuit 46 from surge arrestor 26, and the housing of surge arrestor 26 has a wall or cover 26a separating it from breaker 18. At least one of these walls or covers 18a and 26a serves as a thermal barrier reducing heat transfer from MOV 32 to thermal trip circuit 46 in circuit breaker 18. Surge arrestor 28 and breaker 22 have a mirror image construction and arrangement and, therefore, the description need not be repeated.

It is believed that MOV 32 degrades gradually when subjected to surges. When subjected to energy beyond its surge lifetime rating, MOV 32 is believed to produce an increase in current even at a constant operating voltage. Such current causes MOV 32 to become hotter and this, in turn, produces more current. Ultimately, MOV 32 fails from thermal runaway. Several circuit breaker/surge arrestor packages constructed in accordance with the invention and using MOV devices Siemens COMPONENTS, INC. Catalog No. LS40K230QP had their MOV's conditioned with high level voltage (approximately 300V) to cause the onset of MOV failure. Each MOV took a certain time until failure onset, which in this specification is defined as the transient point after which current flow through the MOV continually increased while the same voltage was maintained. With the voltage maintained, certain additional time elapsed from the failure onset point until the MOV permitted a threshold current of approximately 0.5 Amps to flow through it. The term threshold current is used in this context to refer to a substantially continuous current, i.e., current which is not in the form of a short impulse that could be at the same current level of about 0.5 Amps, or even at a somewhat higher level, but is too short in duration to trip circuit breaker 18 magnetically. This flow of threshold current through the MOV heated up the MOV, but the transfer of heat from the MOV to the bi-metal strip in the circuit breaker raised the bi-metal's temperature by less than 10° C., in fact in the range of 1° C. or 5° C. It is believed that this rise in bi-metal temperature is insignificant when compared with the bi-metal's tripout temperature, which is believed to be in excess of 100° C. When activated at a steady state current flow of 27 Amps, the bi-metal temperature at time of tripout was measured at 127° C., a rise of 102° C. from the ambient. Under these conditions, the time to thermal tripout at this current flow was approximately 40 minutes. After the test MOV's were conditioned to the point of passing 0.5 Amps of substantially continuous, non-impulse current and were allowed to cool, the resistance of each was less than 11KΩ, in fact the resistance of all but one was less than 1KΩ, thus indicating that each MOV had absorbed enough energy to exceed its surge lifetime rating. The final mode of failure of each MOV was a rapid increase of current, to a current in excess of 100 Amps, within a time of no more than 11 milliseconds, which high current causes a rapid clearing by tripping the magnetic circuit of the circuit breaker under conditions in which very little heat is transferred from the MOV to the bi-metal strip of the associated circuit breaker. The test confirmed that with the components discussed above in the exemplary embodiment of the invention, the heat transfer from the MOV to the thermal trip circuit of the associated circuit breaker will not by itself cause thermal tripping under the test conditions and that during failure transition of the MOV the circuit is cleared by the much more rapid magnetic tripping of the associated circuit breaker, which by itself provides suitable circuit protection.

We claim:

1. A circuit breaker/surge arrestor comprising:
   a circuit breaker for connecting a line to a load, having a thermal trip circuit and a magnetic trip circuit each responsive to an overcurrent having respective characteristics to trip the circuit breaker and thereby disconnect the load from the line;
   a surge arrestor in series with the circuit breaker and comprising a sacrificial Metal Oxide Varistor (MOV) responsive to a respective threshold of current passage through the MOV to cause the magnetic trip circuit to trip the circuit breaker before the thermal trip circuit has had an opportunity to trip; and
   an indicator circuit coupled with the surge arrestor and comprising an indicator light which is visible from outside the surge arrestor and has ON and OFF states indicative of the operational status of the MOV and the circuit breaker and wherein the threshold of current passage through the MOV corresponds to the passage through the MOV of a substantially continuous current at the level of approximately 0.5 Amperes and defines an MOV failure onset.

2. A circuit breaker/surge arrestor as in claim 1, in which said indicator circuit comprises a series network of a Light Emitting Diode (LED) and a resistor, said series network being connected across said MOV to cause to LED to be ON only when significant current flows through the circuit breaker but not through the MOV.

3. A circuit breaker/surge arrestor as in claim 1, in which the thermal trip circuit comprises a thermal element which trips the circuit breaker when the element's temperature exceeds a threshold which is in excess of 100° C., and heat generated in the MOV up to said failure onset and transferred to the thermal element causes a rise of less than 10° C. in the element's temperature.

4. A circuit breaker/surge arrestor as in claim 1, in which the thermal trip circuit comprises a thermal element which trips the circuit breaker when the element's temperature exceeds a threshold which is in excess of 100° C., and heat generated in the MOV up to said failure onset and transferred to the thermal element causes a rise of less than 10° C. in the element's temperature.

5. A circuit breaker/surge arrestor as in claim 1, including a thermal barrier between the surge arrestor and the circuit breaker to resist heat transfer from the MOV to the thermal trip circuit.

6. A circuit breaker/surge arrestor as in claim 5, in which the thermal barrier comprises a wall between the circuit breaker and the surge arrestor.

7. A plug-in, integrated circuit breaker/surge arrestor package comprising:
   a circuit breaker for connecting a load to a line, said circuit breaker having a breaker contact for connection to the line and a load side breaker contact, and further having a thermal trip circuit and a magnetic trip circuit connected between the load side breaker contact and the load, said contacts when closed connecting the load to the line through said trip circuits and when open disconnecting the load from the line, and said magnetic trip circuit and said thermal trip circuit each responding to an overcurrent having respective characteristics to open the contacts;
   a surge arrestor integrally mounted with said circuit breaker and comprising a Metal Oxide Varistor (MOV) having a clamping limit and connected between the trip circuits and ground, said MOV being responsive to surges having selected characteristics and exceeding said clamping limit to rapidly divert current to ground, and said magnetic trip circuit being responsive to rapidly diverted current having respective characteristics to open said breaker contacts; and a thermal barrier between the MOV and the thermal trip circuit to substantially de-couple thermally the MOV from the thermal trip circuit.

8. A plug-in, integrated circuit breaker/surge arrestor package as in claim 9 including an indicator providing an indication, visible from outside the package, of whether the surge arrestor is in a normal operating condition or in a failure mode.

9. A plug-in, integrated circuit breaker/surge arrestor package as in claim 7 in which the electrical and thermal characteristics of the MOV and the thermal barrier are selected to keep heat generated by the MOV due to the rapidly diverted current therethrough from causing the thermal trip circuit to trip before the magnetic trip circuit.

10. A plug-in, integrated circuit breaker/surge arrestor package as in claim 9 in which each of the circuit breaker and the surge arrestor has a respective housing and the thermal barrier comprises a part of at least one of the housings.

11. A plug-in, integrated circuit breaker/surge arrestor package as in claim 10 including an indicator circuit connected between the load and ground in parallel with the MOV, said indicator circuit comprising a Light Emitting Diode (LED) which is ON when only the MOV is essentially an open circuit and the circuit breaker is conducting current, said LED being visible from outside the circuit breaker/surge arrestor package.

12. A method of protecting a load from transients and surges comprising the steps of:
connecting a line to a load through a circuit breaker having a thermal trip circuit and a magnetic trip circuit each of which is responsive to an over-current having respective characteristics to trip the circuit breaker and thereby disconnect the load from the line; and connecting in series with said circuit breaker, a sacrificial surge arrestor comprising a Metal Oxide Varistor (MOV) responsive to a respective threshold of current passage through the MOV to cause the magnetic trip circuit to trip the circuit breaker before the thermal trip circuit has had an opportunity to trip, and wherein current passage through the MOV corresponds to the passage through the MOV of a substantially continuous current at the level of approximately 0.5 Amperes and defines an MOV failure onset and having a thermal barrier between the MOV and the circuit breaker's thermal trip circuit.

13. A method as in claim 12 including providing a status indicator coupled with the arrestor to provide an indication of the operational status of the arrestor that is visible from outside the arrestor.

14. A method as in claim 12, in which the passage of said threshold of current passage through the MOV causes the transfers of head from the MOV to said thermal trip circuit which is substantially below the heat required to cause the thermal trip circuit to trip the circuit breaker.

* * * * *